United States Patent [19]

Dalrymple

[11] Patent Number: 5,428,746
[45] Date of Patent: Jun. 27, 1995

[54] INTEGRATED MICROPROCESSOR UNIT GENERATING SEPARATE MEMORY AND INPUT-OUTPUT DEVICE CONTROL SIGNALS

[75] Inventor: Monte J. Dalrymple, Fremont, Calif.

[73] Assignee: Zilog, Inc., Campbell, Calif.

[21] Appl. No.: 855,526

[22] Filed: Mar. 23, 1992

[51] Int. Cl.$^6$ .................. G06F 13/00; G06Z 13/40; G06Z 13/38
[52] U.S. Cl. .................. 395/275; 395/800; 364/925.6; 364/926.92; 364/926.93
[58] Field of Search ............... 395/550, 275, 800, 325, 395/775; 364/270.3, 270.2, 934.2, 934.3

[56] References Cited

U.S. PATENT DOCUMENTS

| | | | |
|---|---|---|---|
| 4,349,870 | 9/1982 | Shaw et al. | 395/800 |
| 4,482,950 | 11/1984 | Dshkhunian et al. | 395/800 |
| 4,500,933 | 2/1985 | Chan | 360/69 |
| 4,942,516 | 7/1990 | Hyatt | 395/800 |
| 4,958,276 | 9/1990 | Kiuchi et al. | 364/200 |
| 4,970,418 | 11/1990 | Masterson | 364/200 |
| 5,025,414 | 6/1991 | Iwamoto | 364/900 |
| 5,115,503 | 5/1992 | Durkin | 395/550 |
| 5,133,064 | 7/1992 | Hotta et al. | 395/550 |
| 5,163,146 | 11/1992 | Antanaitis, Jr. et al. | 395/550 |
| 5,325,516 | 6/1994 | Blomgren et al. | 395/550 |

OTHER PUBLICATIONS

Dalton, "Intel packs a computer on a chip", LOTUS, Dec. 1990 Full-Text copy 2 pages.

Berlin, "LOCAL BUS", PC World, pp. 143–147, Apr. 93.

Maximum Mode 8088 System—Brey "The INTEL Microprocessors—8086/8088, 80186, 80286, 80386, 80486 Architecture, Programming, and Intefacing", pp. 252–277.

*Primary Examiner*—Thomas C. Lee
*Assistant Examiner*—D. Dinh
*Attorney, Agent, or Firm*—Majestic, Parsons, Siebert & Hsue

[57] ABSTRACT

A microprocessor formed on a single integrated circuit chip has separate sets of terminals providing read and write control timing signals to external memory and input-output devices. The memory control timing signals are generated at a rate as high as the memory devices will allow. The input-output device timing signals are provided at a rate as high as the input-output devices will allow, usually significantly lower rate than that of the memory devices. This then allows the memory transactions to occur at a rate that does not need to be reduced because of slower input-output devices in the same system. The need for external logic is significantly reduced by providing the memory timing signals in a form that is actually input to the memory devices, and by including a capability of providing timing signals to a number of different types of input-output devices having different control signal timing protocol requirements. A computer system using such a microprocessor unit is also described.

12 Claims, 11 Drawing Sheets

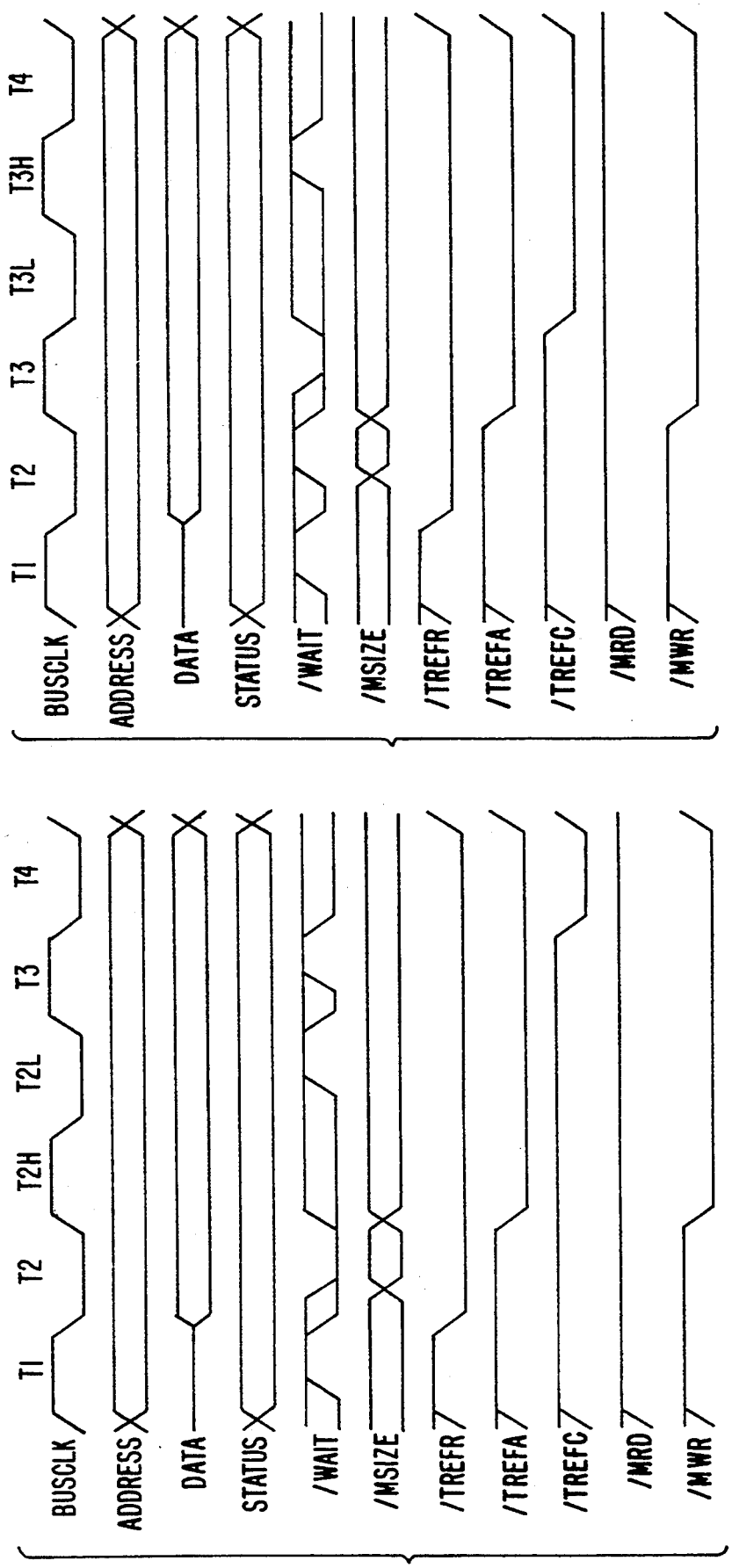

INTEGRATED MICROPROCESSOR UNIT GENERATING SEPARATE MEMORY AND INPUT-OUTPUT DEVICE CONTROL SIGNALS

BACKGROUND OF THE INVENTION

This invention relates generally to microprocessors, and, more specifically, to the control of memory and input-output devices from a microprocessor integrated circuit.

In current computer systems, a microprocessor, usually formed on a single integrated circuit chip, communicates with random access memory (RAM) and input-output (I/O) devices formed on separate integrated circuit chips. In response to program instructions, the microprocessor controls reading from or writing to system RAM and I/O devices over a common system bus. Read and write control signals are communicated from the microprocessor to all such RAM and I/O devices in a computer system. An addressed device or portion of a device then responds by executing a read or write instruction with appropriate timing provided by the respective read or write control signal. Different standard control signal protocols are utilized. Additional logic external of the microprocessor, RAM and I/O devices is often required in order to convert between protocols or provide a device, such as a memory device, with the exact timing signals that it requires for operation in the system. The situation is similar with respect to other control signals, such as interrupt signals, interrupt acknowledge, wait, and so forth.

Therefore, it is a primary object of the present invention to provide a microprocessor capable of directly providing to other circuit chips, such as RAM and I/O devices, the exact control timing signals they require.

It is another object of the present invention to minimize the amount of logic required external of the principal system integrated circuit chips in order to properly communicate control and status signals between them.

It is also an object of the present invention to provide control and status signals that allow various memory and input-output devices to execute transactions with the system bus at the maximum rate possible for those devices.

SUMMARY OF THE INVENTION

These and additional objects are accomplished by the various aspects of the present invention, wherein, briefly and generally, the microprocessor provides separate timing control signals for memory and I/O devices. Microprocessor circuits that generate each set of control timing signals do so at a different speed in order to take advantage of a usual faster operating speed of memory devices. The memory devices are not then slowed in operation as they are when a common set of control timing signals are provided in the system at a rate dictated by slower operating I/O devices.

According to a specific aspect of the present invention, the memory control timing signals are provided by the microprocessor in the form required by most memory devices, thus minimizing the need for external logic to generate the precise memory device timing signals from the control signals provided from the microprocessor. According to another specific aspect of the present invention, the protocol of the I/O device control timing signals can be software-selected in the microprocessor to one of several I/O protocols. Therefore, a computer system may be constructed with I/O devices having one of several control timing signal protocols, without the need for external logic to convert the timing signals from one protocol to another.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIGS. 5A, 5B, 5C and 5D show examples of memory control signals during a write cycle with no waits, a wait during the T1 cycle, a wait during the T2 cycle and a wait during the T3 cycle, respectively;

DESCRIPTION OF A PREFERRED EMBODIMENT

Figure 1:
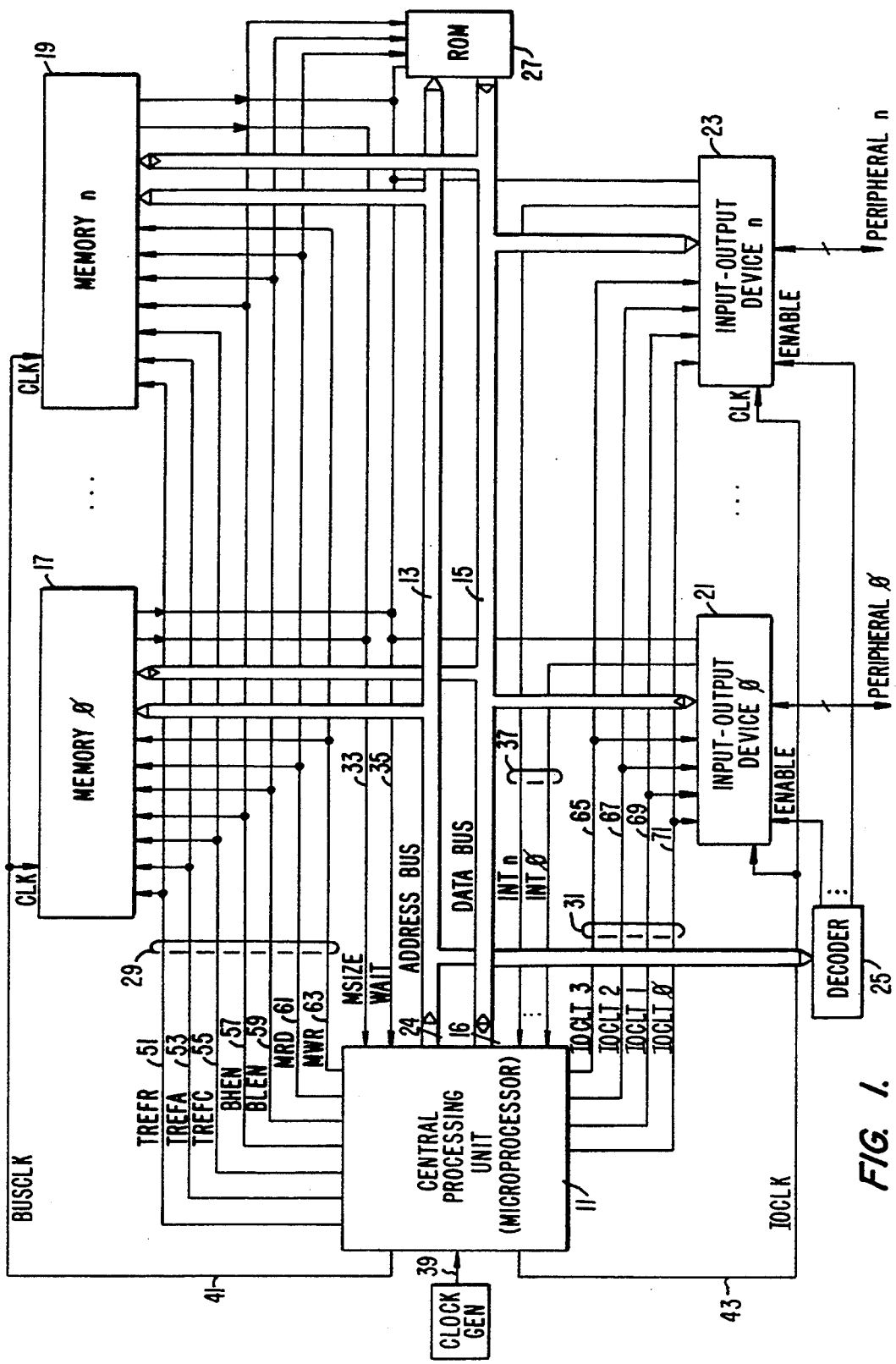
FIG. 1 illustrates a computer system in which the present invention is included.

Referring initially to FIG. 1, a computer system embodying the various aspects of the present invention is first generally described. A single microprocessor integrated circuit chip 11 communicates over address and data buses 13 and 15 with a plurality of memory integrated circuits 17 and 19, such as dynamic RAMs used for primary memory, and a plurality of input-output devices 21 and 23. Although two memory devices 17 and 19 and two I/O devices 21 and 23 are illustrated, any number of each type of device can be utilized from one to n. A usual decoding circuit 25 decodes the address of the various I/O devices from the address bus 13 and generates enable signals to the individual I/O devices 21, 23. Since the main computer system memory formed of devices 17, 19 are RAM, a read only memory (ROM) 27 is also connected to the buses 13 and 15.

Read and write control signals for the memory devices 17, 19 are provided by the microprocessor 11 over seven lines 29, the signals of which are described below. Separate from those memory control timing lines are four additional control lines 31 carrying signals generated by the microprocessor 17 to each of the I/O devices 21, 23. The timing signals in the control lines 29 and 31 are independently controlled within the microprocessor 11 as described below. A memory size status signal is connected from each of the memory devices 17, 19 to the microprocessor 11 over a line 33. Wait states asserted by any of the memory devices 17, 19, or I/O devices 21, 23, are communicated to the microprocessor 11 over a common line 35. Interrupt signals from the individual I/O devices 21, 23 are communicated over individual lines 37 to the microprocessor 11.

The microprocessor 11 receives a master clock signal 39 from a system clock generator 39. As described below, the microprocessor 11 provides a bus clock signal that is optionally communicated over a line 41 to the memory devices 17, 19, where necessary. Some memory devices do not require such a clock but rather operate solely from the timing signals of the control lines 29. A separate I/O clock is derived from the system clock generator 39 by the microprocessor 11 and connected by a line 43 to each of the I/O devices 21, 23, to be used as their clock sources. While memory and bus transactions operate according to the timing of the bus clock signal in a line 41, a separate I/O clock of a lesser frequency is provided in the line 43. I/O devices generally operate at a slower speed than do the fastest memory devices available, so the ability to operate I/O devices at a lower clock frequency than the rest of the system eliminates the need to operate the entire system at the slower I/O device speed.

Figure 5B:
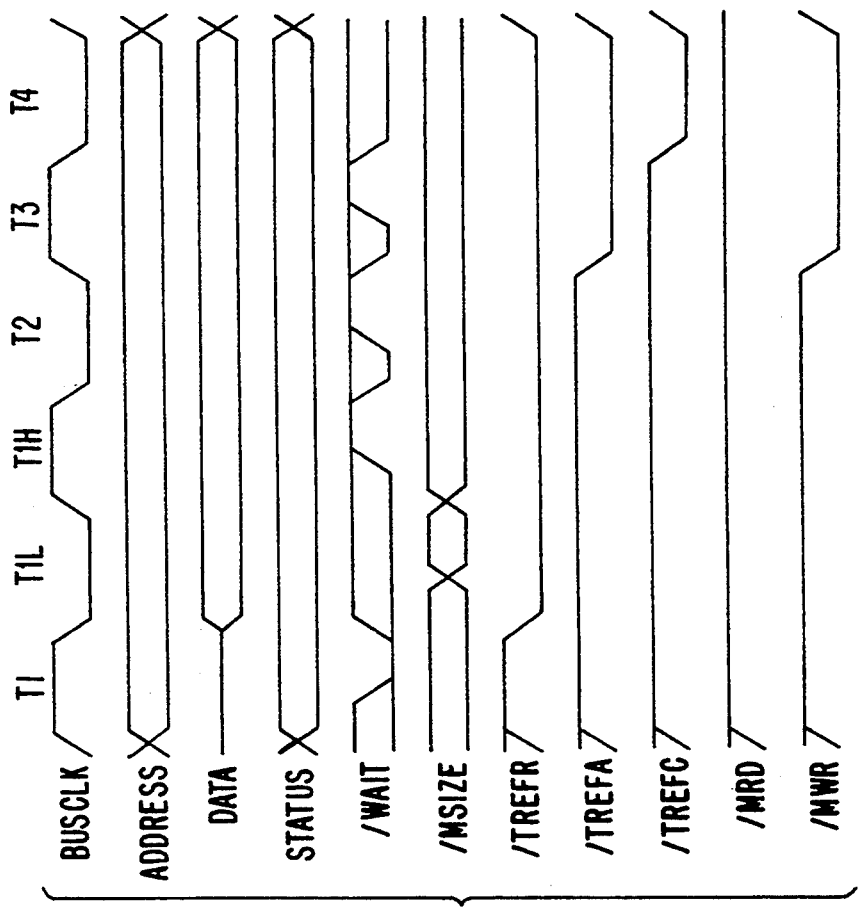
Figure 5A:
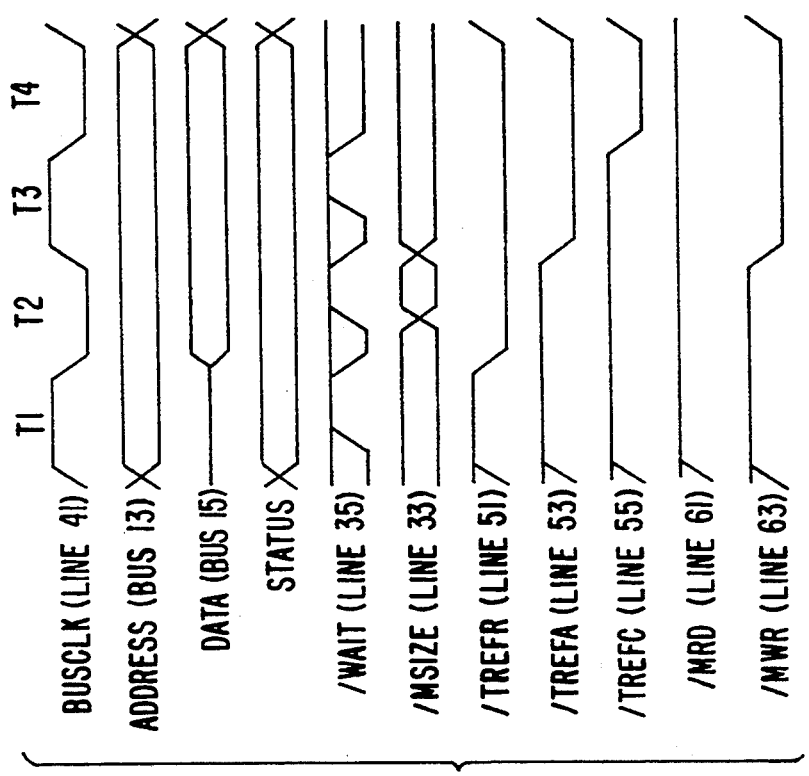
Figure 6B:
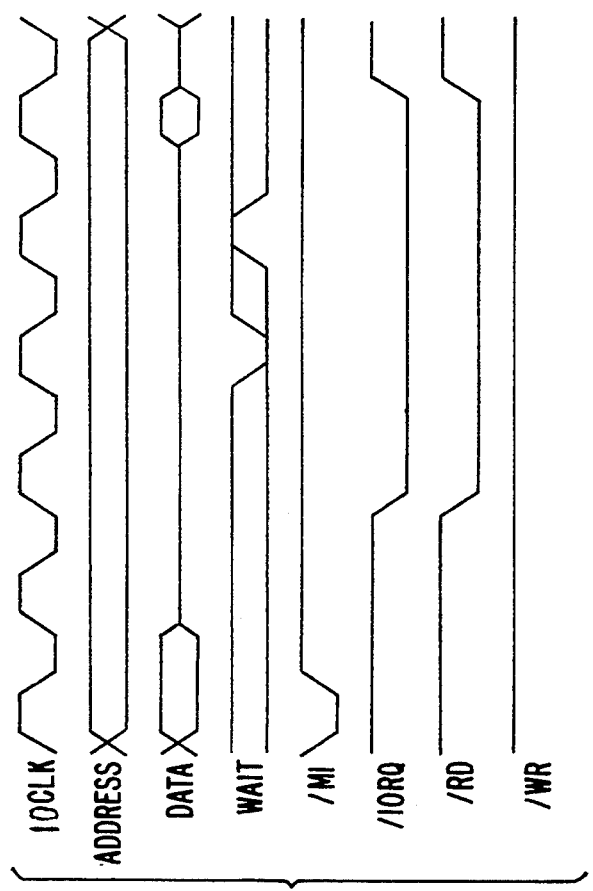
FIGS. 6A and 6B show examples of I/O read cycle timing signals for a Z80 microprocessor bus protocol, respectively having no wait and a wait state in the T1 cycle.
Figure 6A:
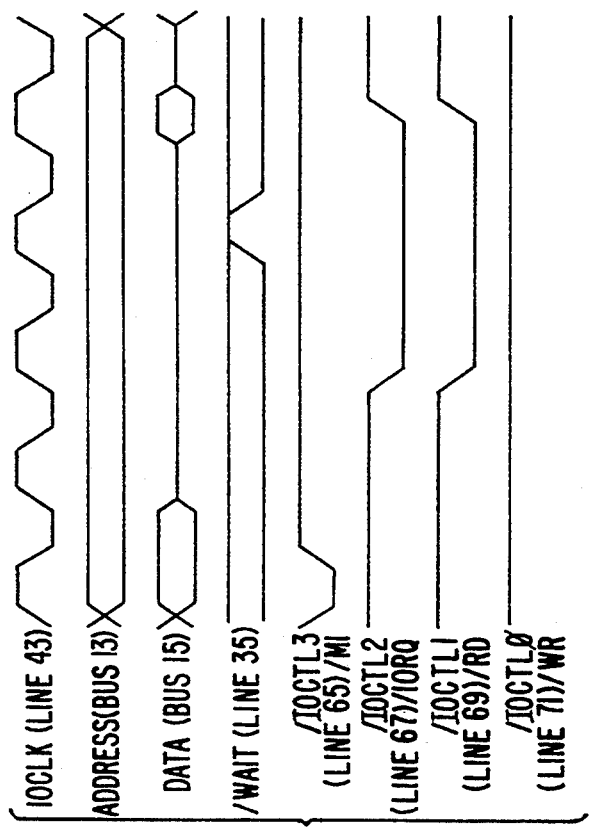
Figure 7A:
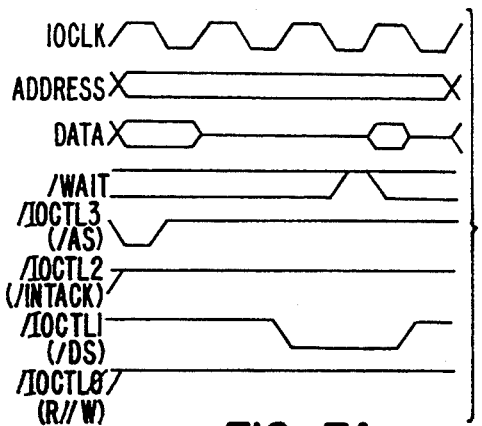
FIGS. 7A and 7B show examples of I/O read cycle timing signals for a Z8000 microprocessor bus protocol, respectively having no wait and a wait state in the T1 cycle.
Figure 7B:
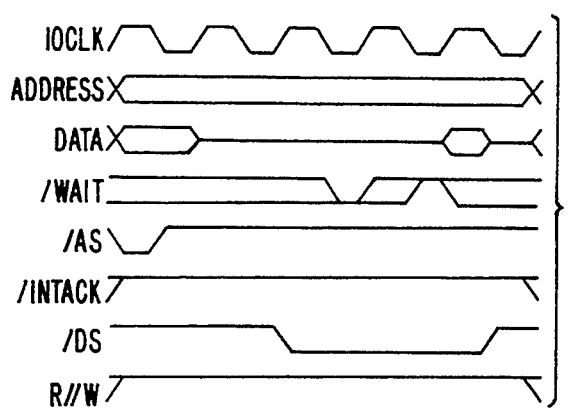
Figure 8A:
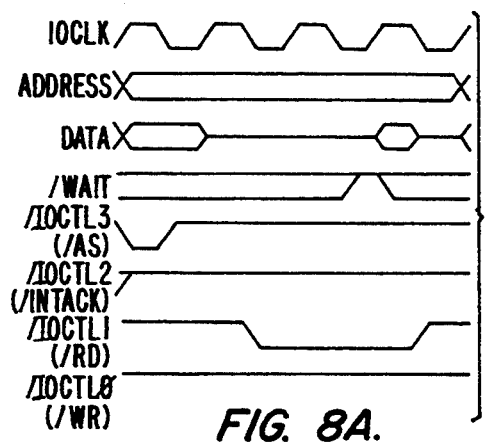
FIGS. 8A and 8B show examples of I/O read cycle timing signals for a Z8500 microprocessor bus protocol, respectively having no wait and a wait state in the T1 cycle.
Figure 8B:
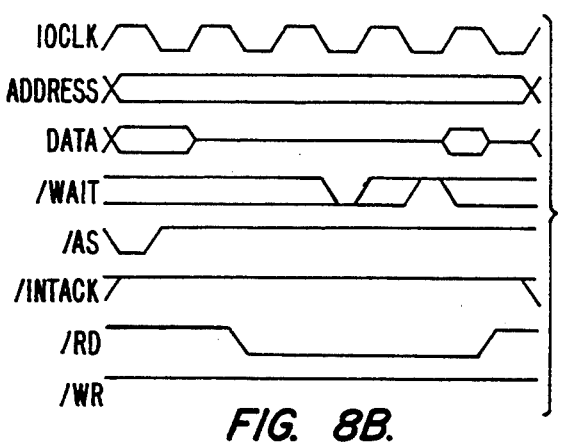
Figure 9A:
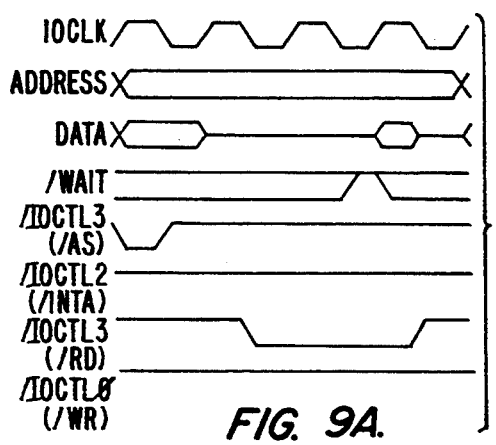
FIGS. 9A and 9B show examples of I/O read cycle timing signals for an 8200 microprocessor bus protocol, respectively having no wait and a wait state in the T1 cycle.
Figure 9B:
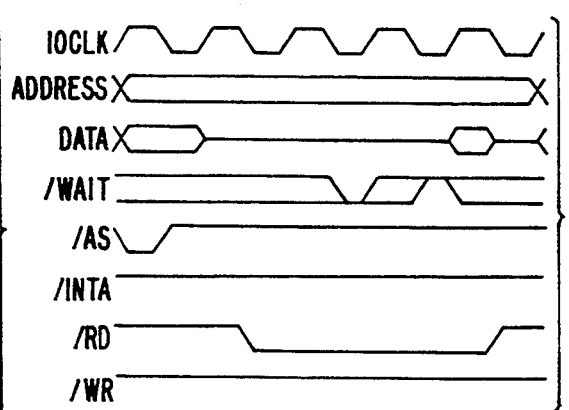
Figure 10A:
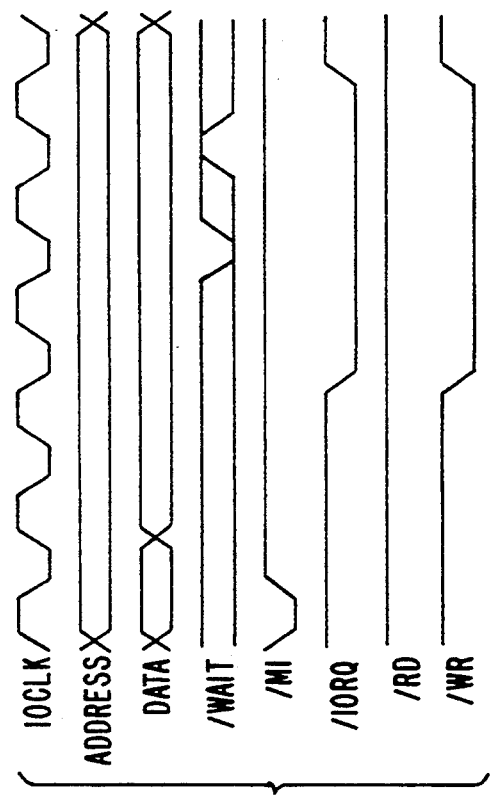
FIGS. 10A and 10B show examples of I/O write cycle timing signals for the Z80 microprocessor bus protocol, respectively having no wait states and a wait state in the T1 cycle.
Figure 10B:
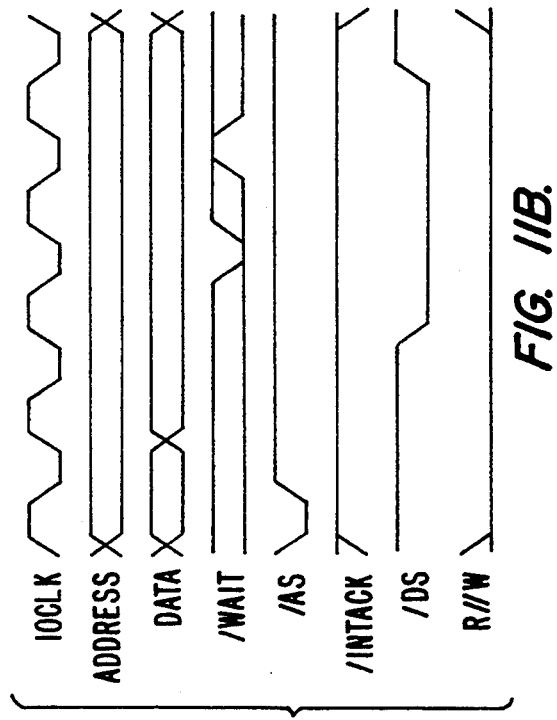
Figure 11A:
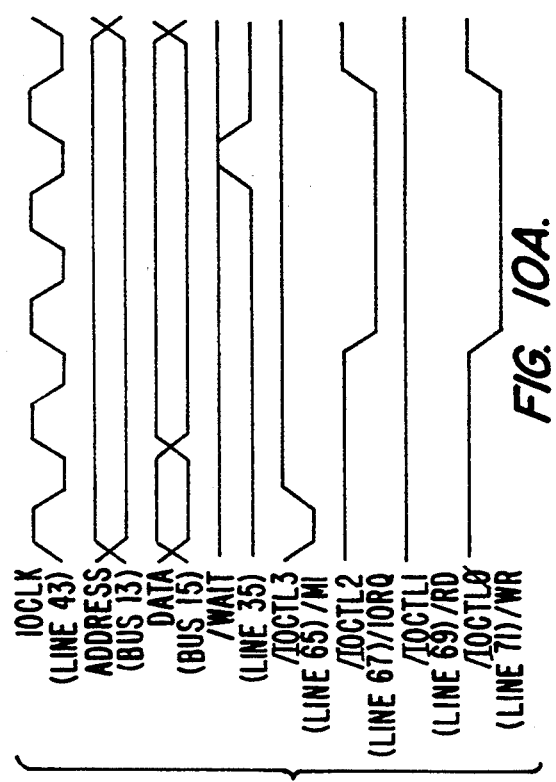
FIGS. 11A and 11B show examples of I/O write cycle timing signals for the Z8000 microprocessor bus protocol, respectively having no wait states and a wait state in the T1 cycle.
Figure 11B:
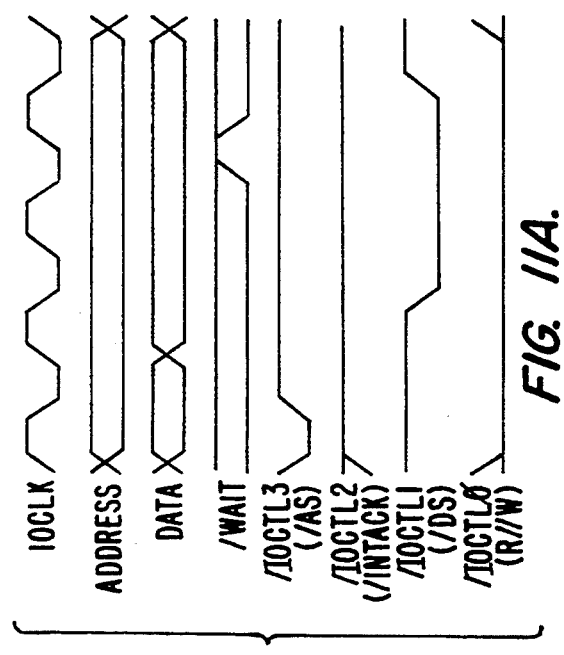
Figure 12B:
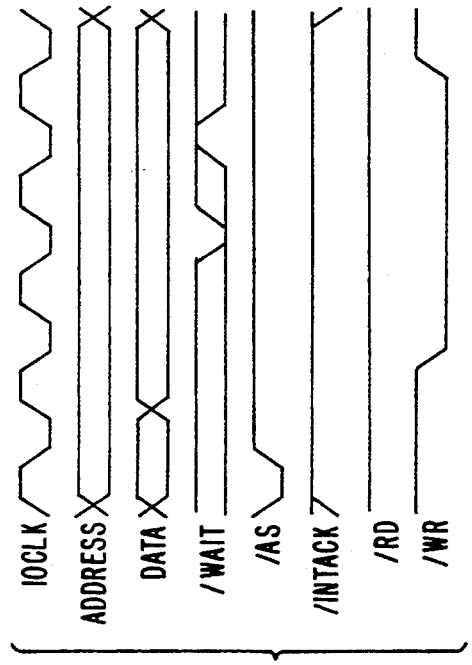
FIGS. 12A and 12B show examples of I/O write cycle timing signals for the Z8500 microprocessor bus protocol, respectively having no wait states and a wait state in the T1 cycle.
Figure 13B:
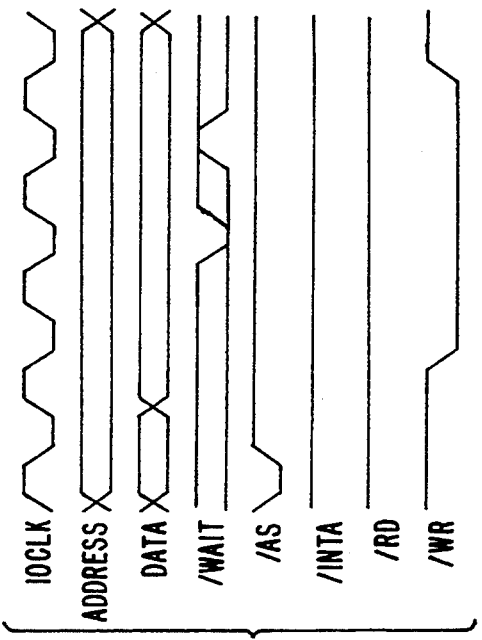
FIGS. 13A and 13B show examples of I/O write cycle timing signals for the 8200 microprocessor bus protocol, respectively having no wait states and a wait state in the T1 cycle.
Figure 12A:
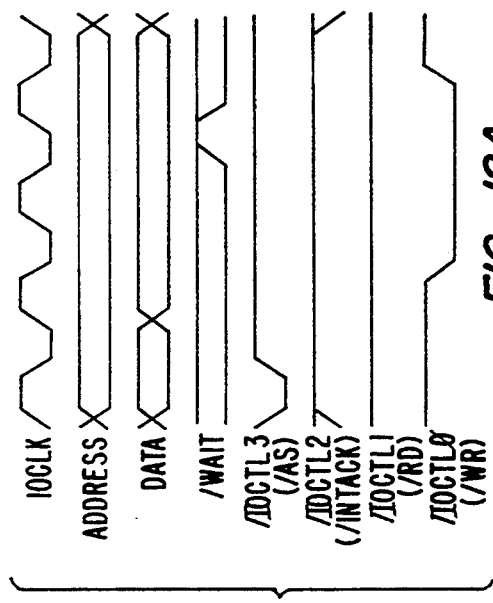
Figure 13A:
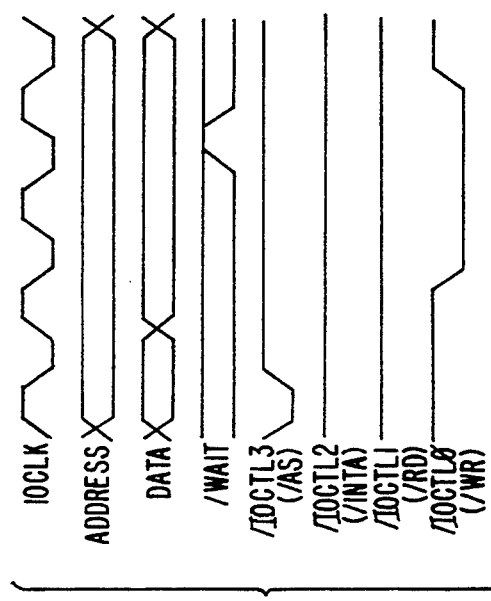
Figure 14A:
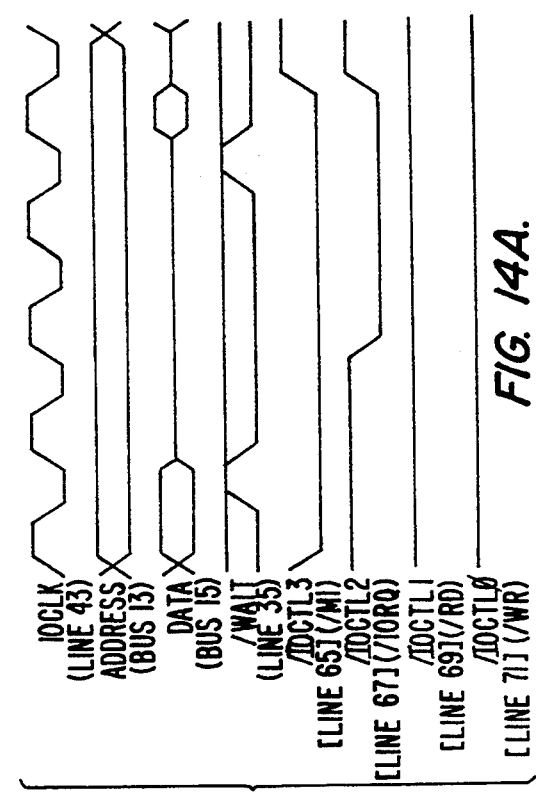
FIGS. 14A, 14B, 14C and 14D show examples of interrupt acknowledge cycle timing signals for the respective Z80 microprocessor, Z8000 microprocessor, Z8500 microprocessor, and 8200 microprocessor bus protocols.
Figure 14B:
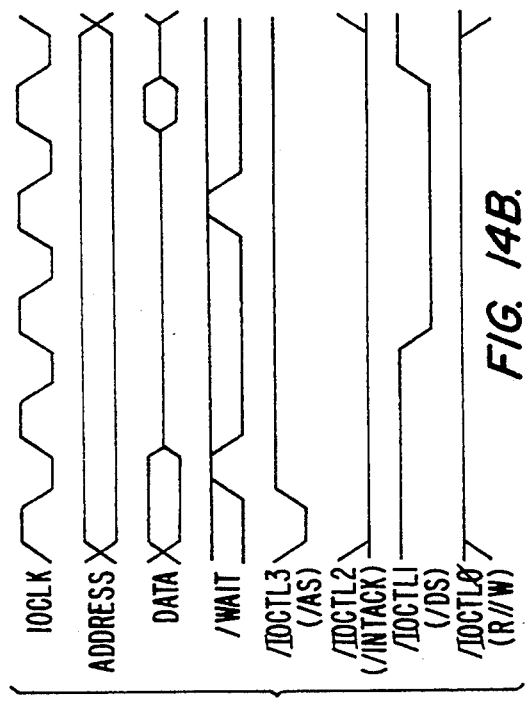
Figure 14C:
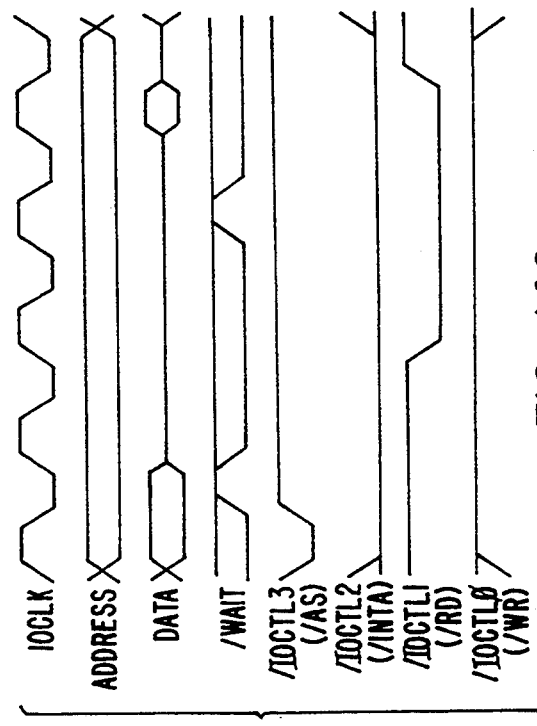
Figure 14D:
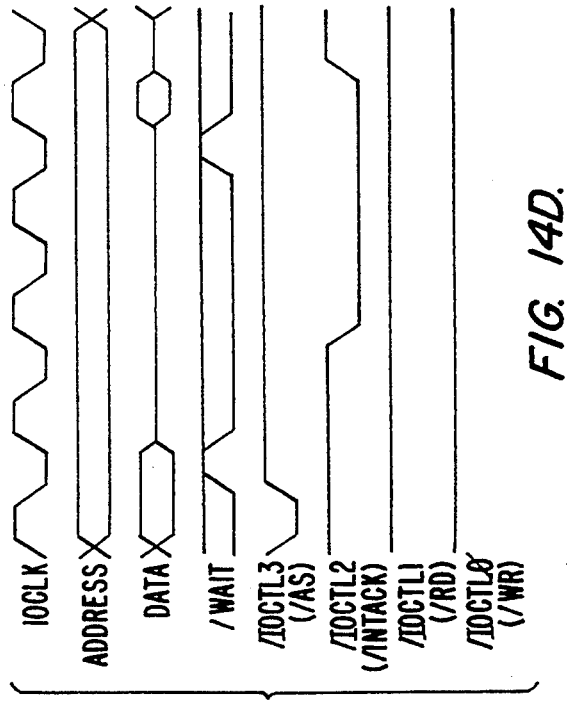

Before proceeding to describe the microprocessor 11 circuits for separately generating the memory control signals in lines 29 and the I/O control signals in line 31, these individual signals will be described. The timing signals in lines 29 are made to be what the memory devices 17, 19 require so no additional logic is necessary between the microprocessor 11 and the memory devices in order to convert to the needs of the memory devices more general timing signals provided by prior art microprocessors. Examples of the use of the control signals in the lines 29, as well as those in the lines 33 and 35, are shown in the timing diagrams of FIGS. 4 and 5. The MSIZE signal on line 33 designates the number of bytes of data that could be read to or written from the memory devices in parallel. The WAIT line 35 goes active when one of the memory devices being accessed requires more time to complete the current transaction before another transaction is initiated. The BUSCLK signal in line 41 is a clock source controlling the memory transactions over the buses 13 and 15.

Each of the signals in the memory control lines 29 will now be described. When a signal designation is preceded with a "/", this indicates that it is active, in one example, when at a low level. The signals carried by the lines 29 are as follows:

1. /TREFR (line 51): This is a standard memory timing signal whose falling edge is used to strobe one half the address on the address bus 13 into the dynamic RAM, such as memory devices 17, 19. This timing reference signal goes low at the end of the T1 cycle and returns high at the end of T4 during either a memory read or a memory write transaction. It can be used as the row address strobe (RAS) signal for dynamic RAM transactions. In addition, the falling edge can be used to capture a byte of an address in a system where the address and data buses are shared by time multiplexing.

2. /TREFA (line 53): This signal is used to control the address multiplexer of dynamic RAMS in cases where the data and address system buses are time multiplexed, or as the RAS signal in systems using higher processor clock rates. This timing reference signal goes low at the end of the T2 cycle and returns high at the end of the T4 cycle during either a memory read or memory write operation.

3. /TREFC (line 55): The falling edge of this signal is used to strobe the remaining one half address into the dynamic RAM. This timing reference signal goes low at the end of the T3 cycle and returns high at the end of the T4 cycle during either a memory read or a memory write. It is used as the column address strobe (CAS) signal for dynamic RAM accesses.

4. /BHEN (line 57): This signal is asserted at the beginning of a memory transaction to indicate that an operation on the higher byte of the data bus is requested. When the MSIZE signal is asserted, indicating only a byte wide memory, a second memory transaction is performed in order to effect a two byte memory transaction. The second transaction is performed to transfer the data via the lower byte of the data bus 15.

5. /BLEN (line 59): This signal is asserted at the beginning of a memory transaction to indicate that an operation on a lower byte of the data bus 15 is requested. If MSIZE is asserted, only the data on the lower byte of the memory will be transferred during a single transaction and another transaction will be performed to transfer the higher byte data on the lower byte of the data bus 15.

6. /MRD (line 61): This is a standard read strobe signal for dynamic RAMs, static RAMs, various types of ROMs, and so forth. This signal is active from the end of the T1 cycle until the end of the T4 cycle during memory read transactions.

7. /MWR (line 63): This is a standard write strobe for dynamic RAMs, static RAMs, various types of ROMs, and so forth. This signal is active from the end of the T2 signal until the end of the T4 cycle during memory write transactions.

While these memory transaction timing signals in the lines 29 provide what is necessary for most memory devices without change, commercially available I/O devices do not respond to a single set of timing signals for controlling access to them. Therefore, the microprocessor 11 additionally provides the ability for the user to select one of four different timing protocols employed by available I/O devices. The selected protocol timing signals are generated on a common set of control lines 31. Four sets of control signals provided in this specific example are illustrated in the following table:

|  | A | B | C | D |
|---|---|---|---|---|
| /IOCTL3 (line 65) | /M1 | /AS | /AS | /AS |
| /IOCTL2 (line 67) | /IORQ | /INTAK | /INTAK | /INTA |
| /IOCTL1 (line 69) | /RD | /DS | /RD | /RD |
| /IOCTL0 (line 71) | /WR | R//W | /WR | /WR |

Column A identifies the common timing signals provided on the various control lines 31 for a protocol used by the Z80 family of peripheral devices, that in column B for the Z8000 microprocessor protocol, that in column C for a more general purpose Z8500 protocol used by the Motorola microprocessor family, and column D a more general purpose 8200 protocol utilized by Intel Corporation in its microprocessor product families. The Z80 and Z8000 family protocols originated from Zilog, Inc., Assignee of the present application. These four sets of protocols allow the single microprocessor 11 to be utilized with nearly all the I/O device families that are currently being used in large volumes.

The various signals shown in the above table are as follows:

1. /M1: This signal indicate machine cycle one for the Z80 microprocessor protocol.
2. /AS: This is an address strobe but is used differently in the protocol of column B of the above table, than in the protocols of column C and D. In the protocol of column B, the signal is used by the peripheral device to latch into a register the address on the data bus. In the protocols of columns C and D, on the other hand, this signal is not used by the peripherals.
3. /RD: This is the read strobe and is used to strobe data from the peripherals onto the data bus during I/O read transactions.
4. /WR: This is the write strobe signal, used to strobe data into the peripherals from the data bus during an I/O write transaction.
5. R//W: This signal is high during I/O read transactions and low during I/O write transactions.
6. /DS: This data strobe signal is used to strobe the data into or from an I/O device, depending upon the state of the R//W signal.
7. /IORQ: This signal is active during all I/O read and write transactions and interrupt acknowledge transactions.
8. /INTAK: This signal is high during I/O read and write transactions and low during interrupt acknowledge transactions, in order to distinguish between the two.
9. /INTA: This interrupt acknowledge strobe signal is used to read an interrupt vector from the requesting device.

Figure 2:
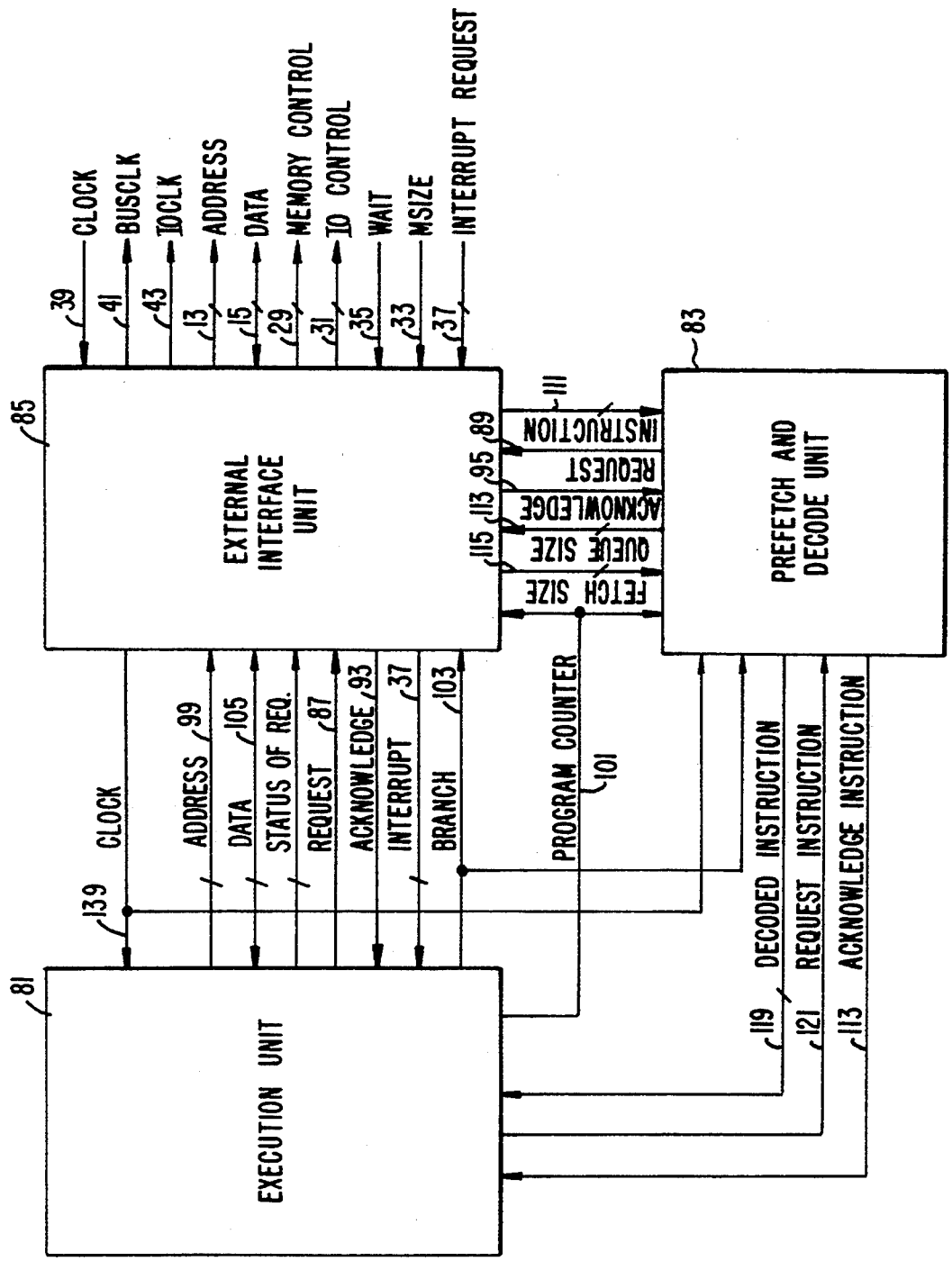
FIG. 2 is a block diagram of the microprocessor of the system of FIG. 1.
Figure 3:
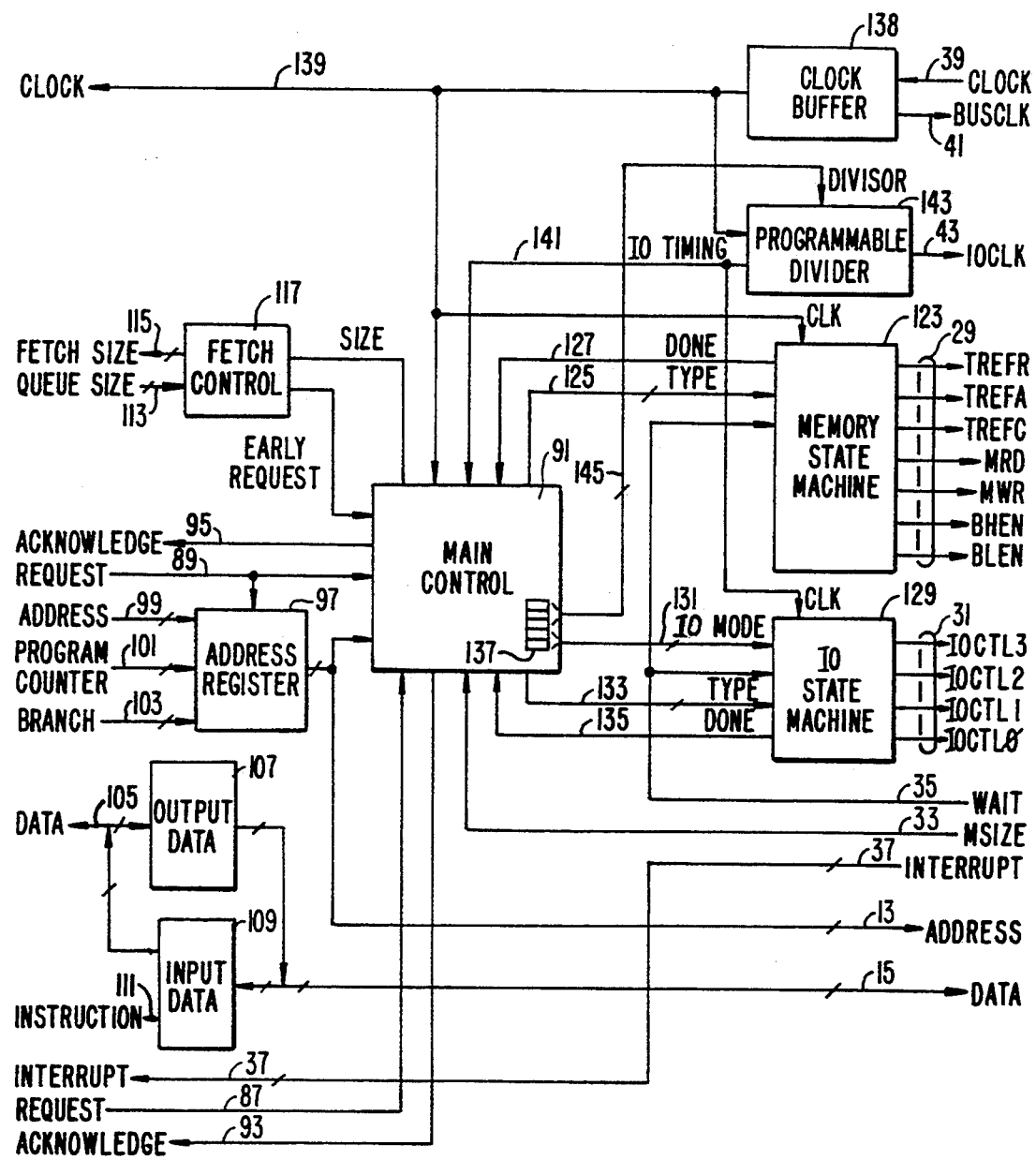
FIG. 3 is a block diagram of the external interface of the microprocessor of FIG. 2, showing an implementation of other aspects of the present invention.
Figure 4A:
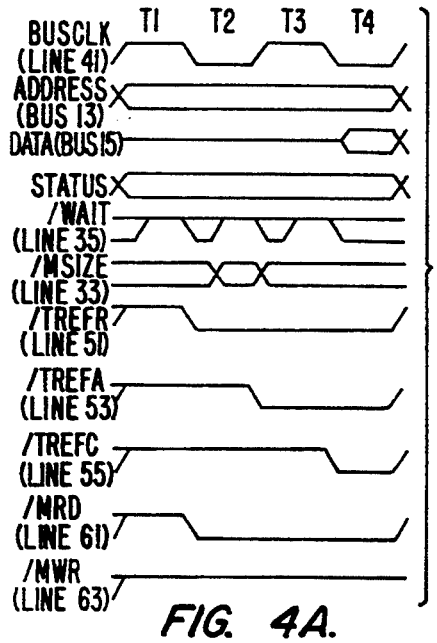
FIGS. 4A, 4B, 4C and 4D provide examples of memory read cycles having no waits, a wait in the T1 cycle, a wait in the T2 cycle and a wait in the T3 cycle respectively.
Figure 4B:
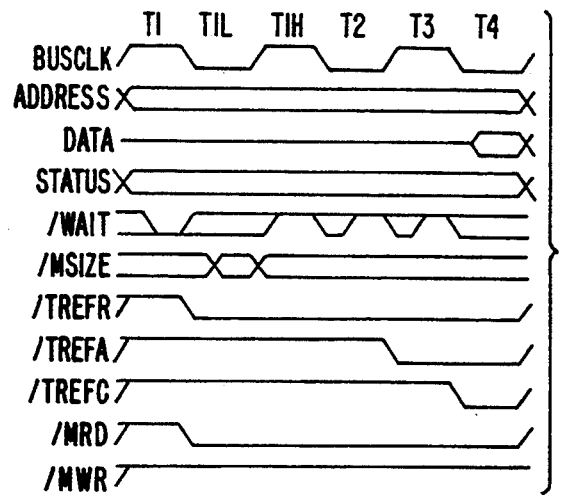
Figure 4C:
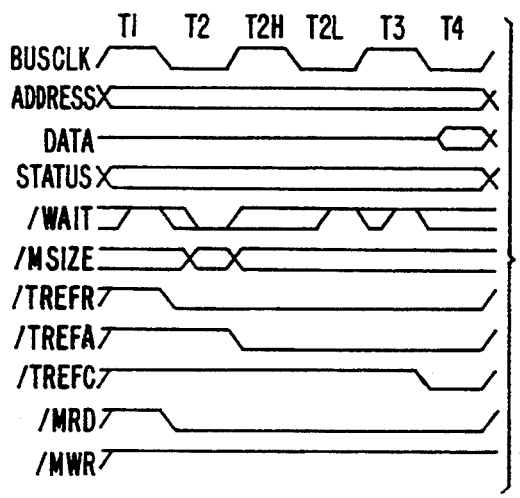
Figure 4D:
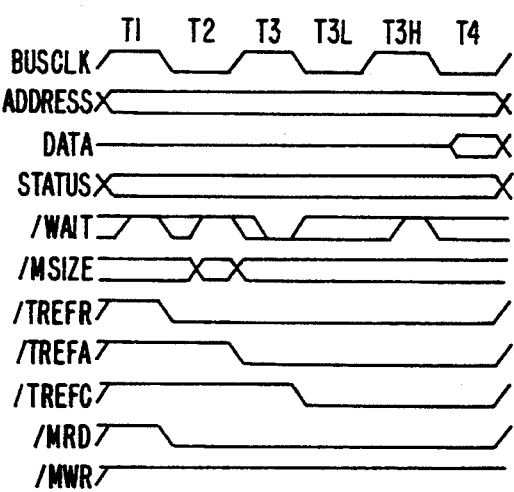

Referring now to FIGS. 2 and 3, the overall structure of the microprocessor 11, with emphasis on its portions that operate to generate these various memory and I/O device control timing signals, will be described. The overall microprocessor system is illustrated in FIG. 2 to include three parts. An execution unit 81 executes instructions while a unit 83 prefetches from memory and decodes those instructions. Interface circuits 85 provide for communication of the units 81 and 83 with memory, I/O devices and other components external of the microprocessor 11 over the bus system 13 and 15 (FIG. 1). Since the present invention is embodied primarily in the external interface unit 85 (FIG. 2) its structure is shown in more detail in FIG. 3.

The external interface unit 85 responds to a request in a line 87 from the execution unit 81 or in a line 89 from the prefetch and decode unit 83. A main control unit 91 of the external interface 85 receives these requests and returns a request acknowledge signal in either a line 93 or a line 95. The request is to either access external memory devices in order to obtain an instruction, the usual request of the prefetch and decode unit 83, or to execute a transaction with external memory or I/O devices in response to an instruction, which comes from the execution unit 81. An address register 97 supplies an address for such a transaction to the address bus 13 in response to the following from the execution unit 81: an address in lines 99, the state of a program counter of the execution unit 81, as given in lines 101, and a branch or jump command in a line 103. Data from the execution unit 81 is written into an addressed memory location or I/O device by being coupled through output logic 107 to the system data bus 15. Data being read from an addressed memory location or I/O device and received on the data bus 15 is passed through input data logic 109 and applied to either the data bus 105 or an instruction bus 111, depending upon the nature of the information being obtained.

The prefetch and decode unit 83 includes a first-in-first-out (FIFO) memory for temporary storage of prefetched instructions. It provides in circuits 113 an indication of the amount of space left in the FIFO memory and receives in circuits 115 an indication of the size of an instruction being prefetched. These signals are communicated between the unit 83 and the main control circuit 91 (FIG. 3) of the unit 85 through logic 117. The unit 83 (FIG. 2) provides a decoded instruction to the execution unit 81 through circuits 119 in response an instruction being requested over a line 121. Such an instruction is also acknowledged by the unit 83 to the unit 81 by a line 123.

The external interface unit of FIG. 3 generates the previously described memory timing signals in circuits 29 from a state machine 123. The state machine includes a routine to generate the signals indicated in FIGS. 4 and 5. The routine executed by the state machine 123, and thus the set of output timing signals in lines 29, is selected by an input signal in lines 125 from the main control unit 91. This input specifies the nature of the memory transaction to be performed. Memory read and write transactions are included. The combination of this input and the state of the wait signal line 35 provides a starting address for the operation of the state machine 123 to produce the designated output timing signals in the lines 29. When the routine is completed, a completion signal is sent back to the main control 91 by way of a line 127.

Similarly, another state machine 129 generates timing signals in the I/O control lines 31 in response to the contents of two input circuits 131 and 133, as well as the wait line 35. When the state machine has cycled through a given routine, thus producing one of the timing signal sets of FIGS. 8–13, a completion signal is sent back to the main control 91 on a line 135.

The input circuits 131 carry two bits from an internal control register 137 of the main control circuit 91. These two bits specify the signal protocols of the I/O devices being connected to the microprocessor 11, one of devices A, B, C or D as described with respect to the table given above. The inputs in circuits 133 specify the type of transaction with an I/O device that is to be performed. This includes read and write transactions.

The two state machines 123 and 129 are preferably operated with different clock frequencies consistent with the maximum speed of operation of the devices connected with them. A clock buffer 138 receives the external clock signal in line 39 and provides it as the main internal clock on a line 139. This clock drives nearly the entire circuit, including the memory state machine 123. The external bus clock signal in line 41 is the same frequency as the internal clock 139 but may be shifted one-half period in phase.

A reduced frequency clock is obtained in a line 141 from an adjustable divider circuit 143. The clock signal in line 139 is applied to the dividing circuit 143, which divides its frequency by an integer divisor specified in control lines 145. The resulting clock signal in the line 141 is used primarily to drive the I/O state machine 129. The external I/O clock in line 43 is set to the same frequency as that in the line 141 but may be shifted one-half period in phase.

The integer divisor in circuits 145 is stored in a three-bit field of the I/O control register 137. This field, as all others in the I/O control register, are loaded by the execution unit 81. The divisor is selected to reduce the I/O clock to a level that can be accommodated by the chosen external I/O devices.

Although the various aspects of the present invention have been described with respect to a preferred embodiment thereof, it will be understood that the invention is entitled to protection within the full scope of the appended claims.

It is claimed:

1. As part of a digital processor architecture including a central processing unit (CPU) interconnected with at least one random access memory device and at least one input-output (I/O) device through a common address and data bus structure, a system for providing control of reading from and writing to said at least one memory device and said at least one I/O device, comprising:
   means within said CPU that is responsive to an instruction to read from or write to said at least one memory device over said bus structure for generating and communicating to said at least one memory device a first set of control signals with a first timing, and
   means within said CPU that is responsive to an instruction to read from or write to said at least one I/O device over said bus structure for generating and communicating to said at least one I/O device a second set of control signals that are separate from the first set of control signals and have a second timing different from the first timing, said second control signal set generating means including means responsive to a register field for generating read and write timing signals with one of at least two different I/O device signal protocols as specified by contents of said register field,
   wherein said first and second control signal set generating means are characterized by separately generating said first and second sets of control signals, respectively, whereby the speed of reading and writing operations can be optimized for memory and I/O devices having different data access speeds, and whereby I/O devices having any one of said at least two different signal protocols may be connected directly to said CPU without requiring additional logic outside of said CPU to convert its I/O control signals into that of another protocol.

2. The system of claim 1 wherein said I/O device control signal generating means includes a register containing information specifying one of a plurality of formats of said second set of control signals.

3. The system of claim 2 wherein said I/O device control signal generating means includes a state machine connected to receive the format information contained in said register, thereby to generate said second set of control signals with a specified one of a plurality of formats in accordance with the information contained in said register.

4. The system of claim 1 which additionally comprises means within said CPU for supplying said at least one memory device with a first clock signal, and means within said CPU for simultaneously supplying said at least one I/O device with a second clock signal having a frequency that is controllable independently of a frequency of said first clock signal.

5. The system of claim 1 wherein said first control signal set generating means includes means for generating timing reference signals connected directly to said at least one memory device to strobe an address thereinto from said address bus structure, whereby additional logic external of the CPU is made unnecessary to generate said timing and reference signals.

6. The system of claim 1 wherein each of said CPU, said at least one memory device and said at least one I/O device are formed on separate integrated circuit chips.

7. The system of claim 5 wherein each of said CPU, said at least one memory device and said at least one I/O device are formed on separate integrated circuit chips.

8. The system of claim 5 which additionally comprises means within said CPU that is responsive to a receipt of instructions for decoding and executing said instructions, said decoding and executing means being operated with said first timing, said second timing being slower than said first timing.

9. The system of claim 1 which additionally comprises means receiving data from said at least one memory device for providing said instructions.

10. A processor formed on a single integrated circuit chip, comprising:
   means receiving a fixed frequency clock signal for providing an internal clock signal and a variable frequency clock signal, said variable frequency clock signal having a frequency set by a first control signal that is less than that of said internal clock signal,
   means receiving an instruction for decoding said instruction, said decoding means being operated from said internal clock signal,
   means receiving decoded instructions from said decoding means for executing said instructions, said executing means being operated from said internal clock signal,
   means responsive to a second control signal and to an input-output device read or write instruction decoded by said decoding means for generating input-output circuit timing signals according to one of a plurality of protocols designated by said second control signal, said input-output timing signal generating means being operated from said variable frequency clock signal, means responsive to a memory device read or write instruction decoded by said decoding means for generating memory address strobe signals, said memory strobe signal generating means being operated from said internal clock signal, and means including a register for providing said first and second control signals.

11. The processor according to claim 10 wherein said input-output timing signal generating means includes a first state machine having the second control signal and the decoded input-output device read or write instruction as inputs.

12. The processor according to claim 11 wherein said input-output timing signal generating means includes a second state machine having the decoded memory device read or write instruction as inputs.

* * * * *